March 19, 1935.  F. HENNIG  1,994,517
SIGNALING
Filed April 30, 1932
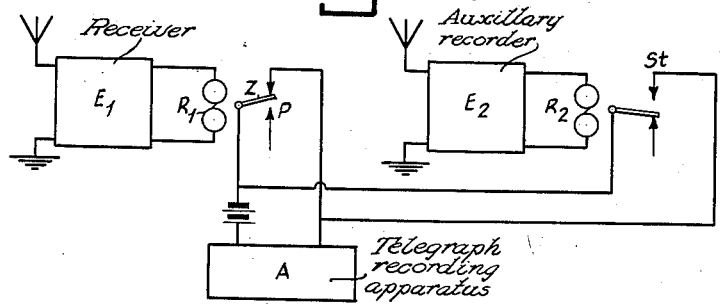
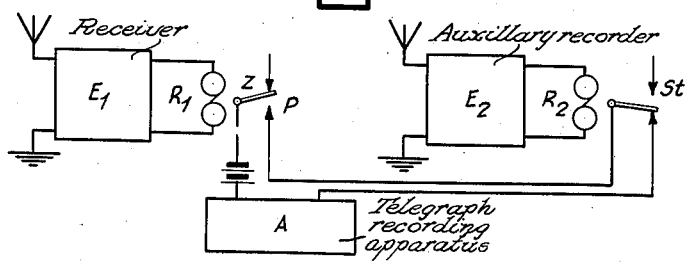
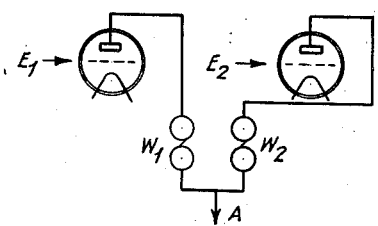 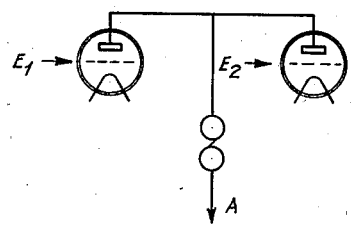
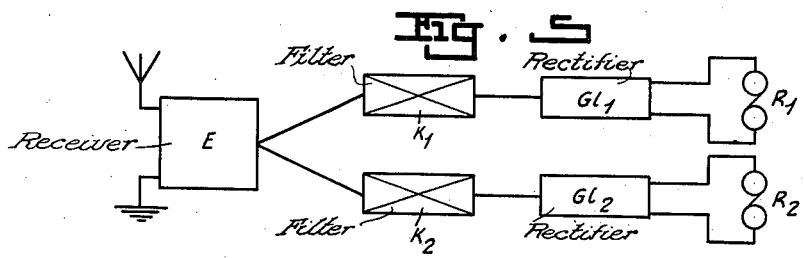
INVENTOR
FRITZ HENNIG
BY
ATTORNEY Patented Mar. 19, 1935

1,994,517

UNITED STATES PATENT OFFICE 1,994,517

SIGNALING

Fritz Hennig, Berlin-Siemensstadt, Germany, assignor to Siemens & Halske, Aktiengesellschaft, Siemensstadt, near Berlin, Germany, a corporation of Germany Application April 30, 1932, Serial No. 608,357
In Germany July 6, 1931

6 Claims. (Cl. 250—8)

This invention relates to means for and a method of eliminating interference in telegraph signals.

More in detail the present invention is concerned with a method to eliminate interference in radio telegraphy according to the Verdan principle. In practical wireless telegraphy, as is well known vitiations of the telegraphic or signal impulses are occasioned by atmospherics and by fading effects. The disturbances causative of space impulses being turned into signal impulses are known as positive interference, whereas the vitiation of signal impulses into spacing impulses are called negative disturbances. The method of eliminating interference known from Verdan resides in that the signals are sent out repeatedly and are similarly received. However, this procedure will result in complete success only when the disturbances occur only in one sense, that is to say, when vitiations happen by signals being changed into spaces, or vice versa.

Up to the present it has been customary to regard the conditions of disturbances in radio telegraphy in such a way that, for long waves (over 1000 m.) one has to figure only with atmospherics, while in the case of short waves only fading arises. Arrangements known in the art of the Verdan type, by the use of integrating means, are so constructed that for at least one incoming non-current impulse one such impulse is passed on. Arrangements are furthermore known in the prior art for eliminating interference in short-wave work in which integrator means are employed which only in the case of a complete reception of a non-current impulse series will pass on one such impulse for the purpose of controlling and operating a translator relay or perforator.

It has also been suggested, by means of a second receiver arranged adjacent to the receiver proper or main receiver at the receiving station, to convert all supplementary signal impulses (atmospheric disturbances) into space impulses. These artificial negative disturbances, conjointly with the natural ones (fading) are so filtered out and separated that, in case of the corresponding signal impulses in repeated transmission only one arrives at the telegraph apparatus, this particular impulse will be recorded as the signal impulse.

However, by practical tests it has been ascertained that the views heretofore generally held, namely, that atmospheric discharges are able to result in only positive disturbances is unfounded. Indeed, the case may arise that a signal impulse, by the action of an atmospheric disturbance, is wholly or partly vitiated into a phase impulse or in other words the impairment of the signal impulse by atmospheric disturbances in which an impulse of static and a desired signal impulse are approximately 180° out of phase with each other so that the static impulse cancels out the desired signal impulse. These negative disturbances may be due to various causes. For example, a partial wave contained in the atmospheric disturbances and which has a frequency similar to that of the signal wave, may travel in phase opposition with the latter, with the result that the effect of the signal wave is more or less neutralized. Furthermore, by a very strong atmospheric one of the tubes of the receiver may become overmodulated with the consequence that the signal wave is either suppressed or markedly diminished.

In the prior art it has been feasible only in the case of short-wave transmission, as previously stated, to insure adequate freedom from trouble upon the arising of both kinds of interference.

Now, according to the invention dependable freedom from positive and negative disturbances is attained also in the case of long-wave transmission work in that, ahead of the telegraphic apparatus equipped with interference eliminator means a device is mounted whereby the negative disturbance is changed into the positive form. At the receiving end, adjacent to the main receiver which picks up the telegraphic signals, a second radio receiver outfit is mounted which is tuned to a closely adjacent frequency band. This receiver serves the object to receive the atmospherics alone, and whenever these have attained a certain limit or have exceeded such limit, they are fed thereby in the form of additional signal impulses to the telegraphic apparatus. By choosing suitable dimensions for this receiver, conditions may be made so that in all instances where for the reasons as above pointed out extinction of a signal impulse in the first receiver occurs the atmospheric disturbances will nevertheless be recorded as positive disturbances by the second receiver. The composition or integration of the impulses coming from both receivers may be effected in the "contact circuits" of two separate rectifier relays or the winding of a joint rectifier relay. The positive disturbances will then be filtered out in the telegraphic apparatus equipped with the interference eliminator device, this being accomplished in such a way that in case of repeated transmission of a signal it is sufficient if from among a train of non-current impulses one such impulse is allowed to pass in order to actuate, for instance, a printing relay or a perforator.

The present disclosure is illustrated by way of example in the accompanying drawing Figs. 1 and 2. Referring to the same, E1 denotes the main receiver outfit which takes up the telegraphic signals, while E2 is the supplementary receiver mounted adjacent thereto and which is tuned to a neighboring wave-length. The plate circuit of both of these receivers contains a relay R1 and R2 respectively. Z designates the position of the keeper in the case of signal impulses, and P that for spacer impulses, while St is that for interfering impulses in the second receiver. A is to denote the telegraphic apparatus proper which is assumed to be equipped with an interference-eliminator. The atmospherics picked up by the second or supplementary receiver $E_2$ are fed by way of the relay $R_2$ in the shape of supplementary signal impulses to the contact circuit of the rectifier relay $R_1$ of the receiver $E_2$.

The circuit scheme in Fig. 1 has been so chosen that to a signal impulse there is coordinated a current in the input circuit. If by action of an atmospheric disturbance which may be either fading of the signal impulse or static which is out of phase with the signal impulse, there arises an interruption of the circuit by way of the keeper of $R_1$, the circuit arranged in parallel thereto will at the same time be made by the agency of the keeper $R_2$. The production of signal impulse in receiver $E_2$ will be recorded as a signal impulse in the second receiver.

The scheme shown in Fig. 2 is of such a nature that in case of a signal impulse a breaking of the input circuit of the telegraphic apparatus will be caused. In case of the arising of an atmospheric disturbance, independently of the position of the keeper of $R_1$, the circuit is always opened by $R_2$.

Figs. 3 and 4 illustrate circuit arrangements wherein the composition or integration of the signal impulses from both receivers is insured in the winding of the joint rectifier relay. In Figure 3 the anode to cathode impedance of the thermionic rectifier in $E_1$ is connected as shown in series with relay winding $W_1$, while the anode to cathode impedance of the thermionic rectifier of $E_2$ is connected in series with a distinct relay winding $W_2$.

In Figure 4 the anode to cathode impedance of the rectifiers of both receivers $E_1$ and $E_2$ are connected in series with a set of relay windings as shown. In the circuit arrangement Fig. 4 the composition of the impulses is effected in one and the same winding.

Fig. 5 illustrates a scheme which is used when the telegraphic impulses are transmitted by a modulated transmitter station. The regular telegraphic impulses and the disturbing impulses are picked up by one receiver. The receiver E is tuned to a radio frequency wave. The filter chain $K_1$ allows the frequency of the transmitter station to be received to pass so that the relay $R_1$ is operated at the rhythm and rate of the radio telegraphic signals. The filter chain $K_2$ is tuned to a frequency band adjacent to $K_1$, and conjointly with the rectifier $Gl_1$ $Gl_2$ and the relay $R_2$ it serves to determine the atmospherics. The integration of impulses takes place in this scheme in a contact circuit of relays $R_1$, $R_2$.

I claim:

1. The method of receiving telegraphy signals free of the effects of static disturbances, both positive and negative, which includes the steps of, receiving signal energy, recording said energy, receiving two portions of energy representative of negative disturbances, and converting one of said portions into positive disturbances combining said signal energy and said positive disturbances before recording said energy.

2. Signaling apparatus comprising, a receiver tuned to the signaling wave, a recording device, an energizing circuit therefor, a contact in said energizing circuit, a magnetic relay interposed between said contact and said receiver, means for neutralizing the effect of negative static disturbances on said recording apparatus comprising, a second receiver tuned to a frequency adjacent the signal frequency, a circuit connected in parallel with the energizing circuit for said recording apparatus, said parallel circuit including a contact and a magnetic relay interposed between said contact and said second named receiver.

3. Signaling means comprising, recording apparatus a receiving apparatus, said receiving apparatus being responsive to signal energy and to static energy of a frequency adjacent the frequency of the signal energy, a plurality of magnetic relays each including an armature, each of said relay armatures cooperating with a separate contact adapted when closed by the armature to complete a circuit connected with said recording apparatus, a filter chain tuned to signal frequency interposed between said receiver and one of said relays, and a filter chain tuned to a frequency adjacent the signal frequency interposed between the receiver and the other of said relays.

4. Signaling apparatus for converting negative disturbances of static which are out of phase with a desired signal, comprising a receiver tuned to the desired signal, a signal recording device having an energy circuit, a contact in said energizing circuit, a magnetic relay interposed between said contact and said receiver, means for converting the effect of said static which is out of phase with a desired signal so as to cause a desired effect on said signal recording device comprising an auxiliary receiver tuned to a frequency adjacent a desired signal frequency, a circuit connected in parallel with the energizing circuit for said recording device, said parallel circuit including a contact and a magnetic relay interposed between said contact and said auxiliary receiver.

5. Signaling apparatus comprising a receiver tuned to the signaling wave, a recording device, an energizing circuit therefor, a contact in said energizing circuit, a relay interposed between said contact and said receiver, means for neutralizing the effect of negative static disturbances on said recording apparatus comprising, a second receiver tuned to a frequency adjacent the signal frequency, a circuit connected in parallel with the energizing circuit for said recording apparatus, said parallel circuit including a contact and a relay interposed between said contact and said second named receiver.

6. Signaling apparatus for converting negative disturbances of static which are out of phase with a desired signal, comprising a receiver tuned to the desired signal, a signal recording device having an energy circuit, a contact in said energizing circuit, a relay interposed between said contact and said receiver, means for converting the effect of said static which is out of phase with a desired signal so as to cause a desired effect on said signal recording device comprising an auxiliary receiver tuned to a frequency adjacent a desired frequency, a circuit connected in parallel with the energizing circuit for said recording device, said parallel circuit including a contact and a relay interposed between said contact and said auxiliary receiver.

FRITZ HENNIG.